US012267154B2

United States Patent
Sugawara et al.

(10) Patent No.: US 12,267,154 B2
(45) Date of Patent: Apr. 1, 2025

(54) FRAME SYNCHRONIZATION APPARATUS FOR A VIDEO SIGNAL (71) Applicants: KABUSHIKI KAISHA TOSHIBA, Tokyo (JP); Toshiba Infrastructure Systems & Solutions Corporation, Kawasaki (JP)

(72) Inventors: Yukihiro Sugawara, Tokyo (JP); Masashi Shiratori, Tokyo (JP); Keita Iwami, Tokyo (JP)

(73) Assignees: KABUSHIKI KAISHA TOSHIBA, Tokyo (JP); Toshiba Infrastructure Systems & Solutions Corporation, Kawasaki (JP)

( * ) Notice: Subject to any disclaimer, the term of this patent is extended or adjusted under 35 U.S.C. 154(b) by 84 days.

(21) Appl. No.: 18/310,695

(22) Filed: May 2, 2023

(65) Prior Publication Data
US 2023/0308202 A1    Sep. 28, 2023

Related U.S. Application Data

(63) Continuation of application No. PCT/JP2021/041215, filed on Nov. 9, 2021.

(30) Foreign Application Priority Data

Nov. 9, 2020  (JP) .................................. 2020-186710

(51) Int. Cl.
*H04J 3/06*   (2006.01)
(52) U.S. Cl.
CPC ............ *H04J 3/0667* (2013.01); *H04J 3/067* (2013.01)
(58) Field of Classification Search
CPC .... H04J 3/0667; H04J 3/067; H04N 21/6437; H04N 21/8547; H04N 21/242
See application file for complete search history.

(56) References Cited

U.S. PATENT DOCUMENTS 10,306,268 B2   5/2019  Kure et al.
11,212,333 B1*  12/2021 Duffy ..................... H04L 65/65
(Continued)

FOREIGN PATENT DOCUMENTS

JP      S5452412 A    4/1979
JP    2002314595 A   10/2002
(Continued)

OTHER PUBLICATIONS

"Generation and Alignment of Interface Signals to the SMPTE Epoch", The Society of Motion Picture and Television Engineers, SMPTE ST 2059-1:2021, Revision of SMPTE ST 2059-1:2015, 2021, pp. 1-33.

(Continued)

*Primary Examiner* — Raymond N Phan
(74) *Attorney, Agent, or Firm* — Maier & Maier, PLLC (57) ABSTRACT

A frame synchronization apparatus according to an embodiment includes a reception unit, a frame memory, a time generation unit, a reception time acquisition unit, a timestamp acquisition unit, and a control unit. The reception unit is configured to receive packet data including video data and a timestamp. The frame memory is configured to store the packet data. The time generation unit is configured to generate a time based on a reference synchronization signal. The reception time acquisition unit is configured to acquire a reception time of packet data satisfying a condition based on the time. The timestamp acquisition unit is configured to acquire a timestamp from the packet data satisfying the condition. The control unit is configured to read packet data from the frame memory in accordance with a variation in a difference between the reception time and a time indicated by the timestamp.

13 Claims, 6 Drawing Sheets

(56) References Cited

U.S. PATENT DOCUMENTS

| | | | |
|---|---|---|---|
| 11,470,369 | B2 | 10/2022 | Mochida et al. |
| 2008/0043743 | A1* | 2/2008 | Nagana ............... H04L 47/28 370/394 |
| 2012/0039194 | A1* | 2/2012 | Kure ................. H04N 19/65 375/259 |
| 2013/0182181 | A1* | 7/2013 | Bichot ............. H04N 21/4622 348/515 |
| 2014/0348184 | A1* | 11/2014 | Kure ................. H04L 65/612 370/503 |
| 2019/0334985 | A1 | 10/2019 | Bradley et al. |
| 2021/0289243 | A1 | 9/2021 | Mochida et al. |

FOREIGN PATENT DOCUMENTS

| | | | |
|---|---|---|---|
| JP | 2003018567 | A | 1/2003 |
| JP | 2003163691 | A | 6/2003 |
| JP | 2008060658 | A | 3/2008 |
| JP | 2010136159 | A | 6/2010 |
| JP | 2012044252 | A | 3/2012 |
| JP | 2017212515 | A | 11/2017 |
| JP | 2018042019 | A | 3/2018 |
| JP | 2019057770 | A | 4/2019 |
| JP | 2020039021 | A | 3/2020 |
| WO | 2020017499 | A1 | 1/2020 |

OTHER PUBLICATIONS

"SMPTE Profile for Use of IEEE-1588 Precision Time Protocol in Professional Broadcast Applications", The Society of Motion Picture and Television Engineers, SMPTE ST 2059-2:2021, Revision of SMPTE ST 2059-2:2015, 2021, pp. 1-33.

"Professional MEdia Over Managed IP Networks: Uncompressed Active Video", SMPTE Standard, SMPTE ST 2110-20:2017, 2017, pp. 1-22.

International Search Report and Written Opinion issued on Jan. 25, 2022, in corresponding International Application No. PCT/JP2021/041215, 12 pages.

Eidson et al., "IEEE-1588™ Standard for a Precision Clock Synchronization Protocol for Networked Measurement and Control Systems", 34th Annual Precise Time and Time Interval (PTTI) Meeting, pp. 243-254.

Office Action issued on Aug. 6, 2024, in corresponding Japanese Application No. 2020-186710, 8 pages.

Extended Search Report issued on Jul. 25, 2024, in corresponding European Application No. 21889307.1, 14 pages.

Schulzrinne et al., "RTP: A Transport Protocol for Real-Time Applications", Network Working Group, The Internet Society, Jul. 31, 2003, XP055733063, 104 pages.

* cited by examiner

F I G. 1

F I G. 2

(a) RTP packet (b) RTP Header (c) Media Payload Header

FRAME SYNCHRONIZATION APPARATUS FOR A VIDEO SIGNAL

CROSS REFERENCE TO RELATED APPLICATIONS

This application is a Continuation Application of PCT Application No. PCT/JP2021/041215, filed Nov. 9, 2021 and based upon and claiming the benefit of priority from Japanese Patent Application No. 2020-186710, filed Nov. 9, 2020, the entire contents of all of which are incorporated herein by reference.

FIELD

Embodiments described herein relate generally to a frame synchronization apparatus.

BACKGROUND

As is well known, in a system for transmitting a video signal, a slight frequency deviation may occur between a reference synchronization signal used in a transmission source which transmits the video signal and a reference synchronization signal used in a broadcasting station which is a reception side of the video signal. The frequency deviation may cause a problem such as a poor appearance in a video, particularly in real-time broadcasting. Therefore, a frame synchronization apparatus is used on the receiving side to compensate for the frequency deviation.

In recent years, a content distribution system for distributing media information such as video and audio using an Internet Protocol (IP) network has been realized. Even in a system using an IP network, a frequency deviation may occur if the reference synchronization is different between the transmission side and the reception side; however, since media information is transmitted as packetized data, a conventional frame synchronization apparatus cannot be simply applied.

In a case where the reference synchronization of both the transmission side and the reception side is a global navigation satellite system (GNSS), the frequency deviation does not occur. However, in a case where one of the sides is placed in an environment in which the GNSS cannot be used, the frequency deviation may occur because a reference synchronization different from the GNSS is used.

Therefore, in a system using an IP network, for example, a method of depacketizing data that was packetized once, then performing frame synchronization, and packetizing the data again is considered. However, such a method has a problem of a high calculation cost. In addition, in a case where the calculation cost is high as described above, a problem of processing delay occurs, which impairs the real-time property of broadcasting, or it is necessary to increase the circuit scale to cope with the problem.

DETAILED DESCRIPTION

A frame synchronization apparatus according to an embodiment includes a reception unit, a frame memory, a time generation unit, a reception time acquisition unit, a timestamp acquisition unit, and a control unit. The reception unit is configured to receive packet data including video data and a timestamp. The frame memory is configured to store the packet data received by the reception unit. The time generation unit is configured to generate a time based on a reference synchronization signal. The reception time acquisition unit is configured to acquire a reception time of packet data satisfying a predetermined condition based on the time generated by the time generation unit. The timestamp acquisition unit is configured to acquire a timestamp from the packet data satisfying the predetermined condition. The control unit is configured to obtain a difference between the reception time and a time indicated by the timestamp, and read packet data from the frame memory in accordance with a variation in the difference.

Hereinafter, an embodiment will be described with reference to the drawings.

Figure 1:
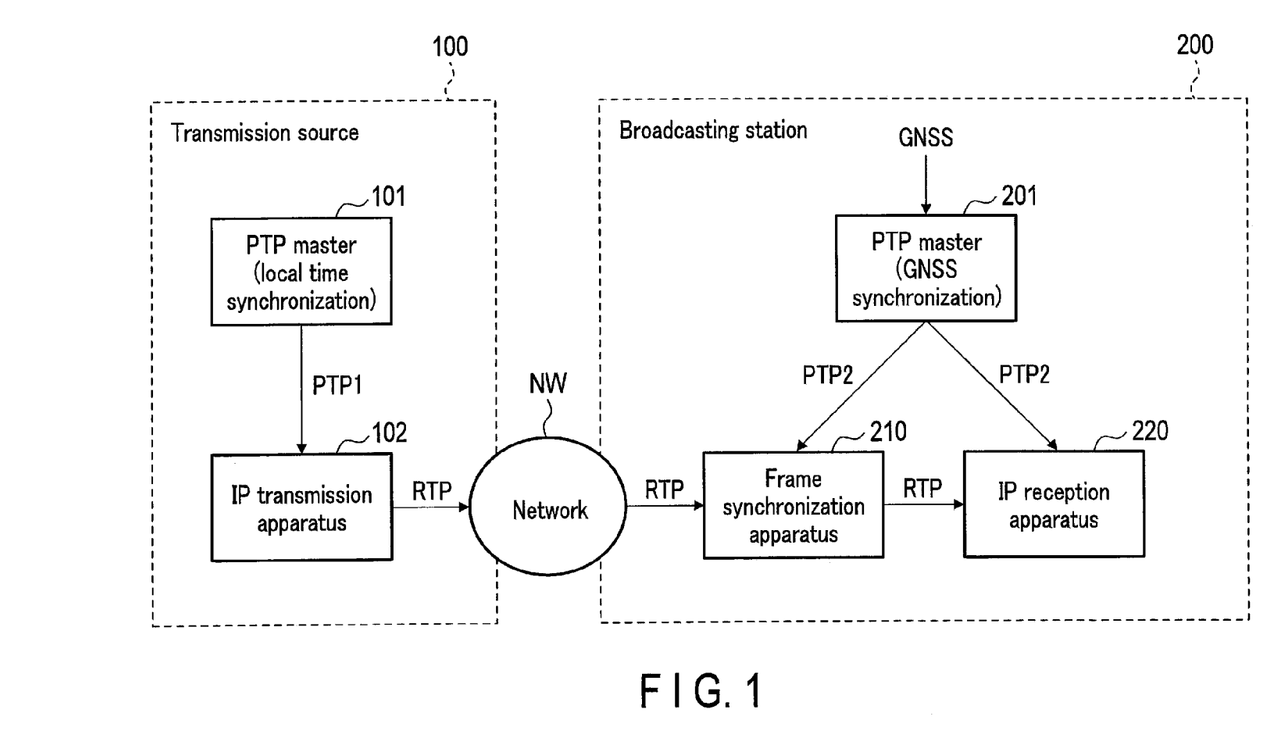
FIG. 1 is a diagram showing a configuration of a content distribution system according to an embodiment.

FIG. 1 shows a configuration of a content distribution system including a frame synchronization apparatus and a computer program according to the embodiment. The content distribution system includes a transmission source 100, a network NW, and a broadcasting station 200.

The transmission source 100 is a device or a facility that transmits media information (video, audio, ancillary, and the like) through the network NW (for example, an optical public network), and is a facility at an imaging location outside the broadcasting station or a broadcasting station other than the broadcasting station 200. The transmission source 100 includes at least a PTP master 101 and an IP transmission apparatus (IP sender) 102.

The PTP master 101 is an apparatus that controls the time used in the transmission source 100, performs time synchronization (local time synchronization) using a precision time protocol (PTP), and generates a transmission source internal time PTP1. Here, it is assumed that the PTP master 101 uses a time source other than a global navigation satellite system (GNSS).

Based on the time PTP1 generated by the PTP master 101, the IP transmission apparatus 102 quantizes (converts into data) the video signal and the audio signal and packetizes them into a real-time transport protocol (RTP) packet. A timestamp based on the time PTP1 and a sequence number incremented for each packet are added to the RTP packet. Then, the IP transmission apparatus 102 transmits the generated RTP packet to the broadcasting station 200 through the network NW.

The broadcasting station 200 is, for example, a facility that broadcasts content via a wireless or wired broadcasting medium or communication medium (not shown), and can broadcast, as the content, media information obtained from RTP packets received from the transmission source 100 via the network NW. The broadcasting station 200 includes at least a PTP master 201, a frame synchronization apparatus 210, and an IP reception apparatus 220.

The PTP master 201 is an apparatus that controls the time used in the broadcasting station 200, performs time synchronization (GNSS synchronization) using the GNSS as a time source, and generates a broadcasting station internal time PTP2. Thus, since the PTP master 101 and the PTP master 201 perform time synchronization using different time sources, there may be a frequency deviation between the transmission source internal time PTP1 and the broadcasting station internal time PTP2.

The frame synchronization apparatus 210 receives the RTP packet transmitted from the transmission source 100 through the network NW, and synchronizes the video-data frame included in the received RTP packet with the broadcasting station internal time PTP2.

Figure 2:
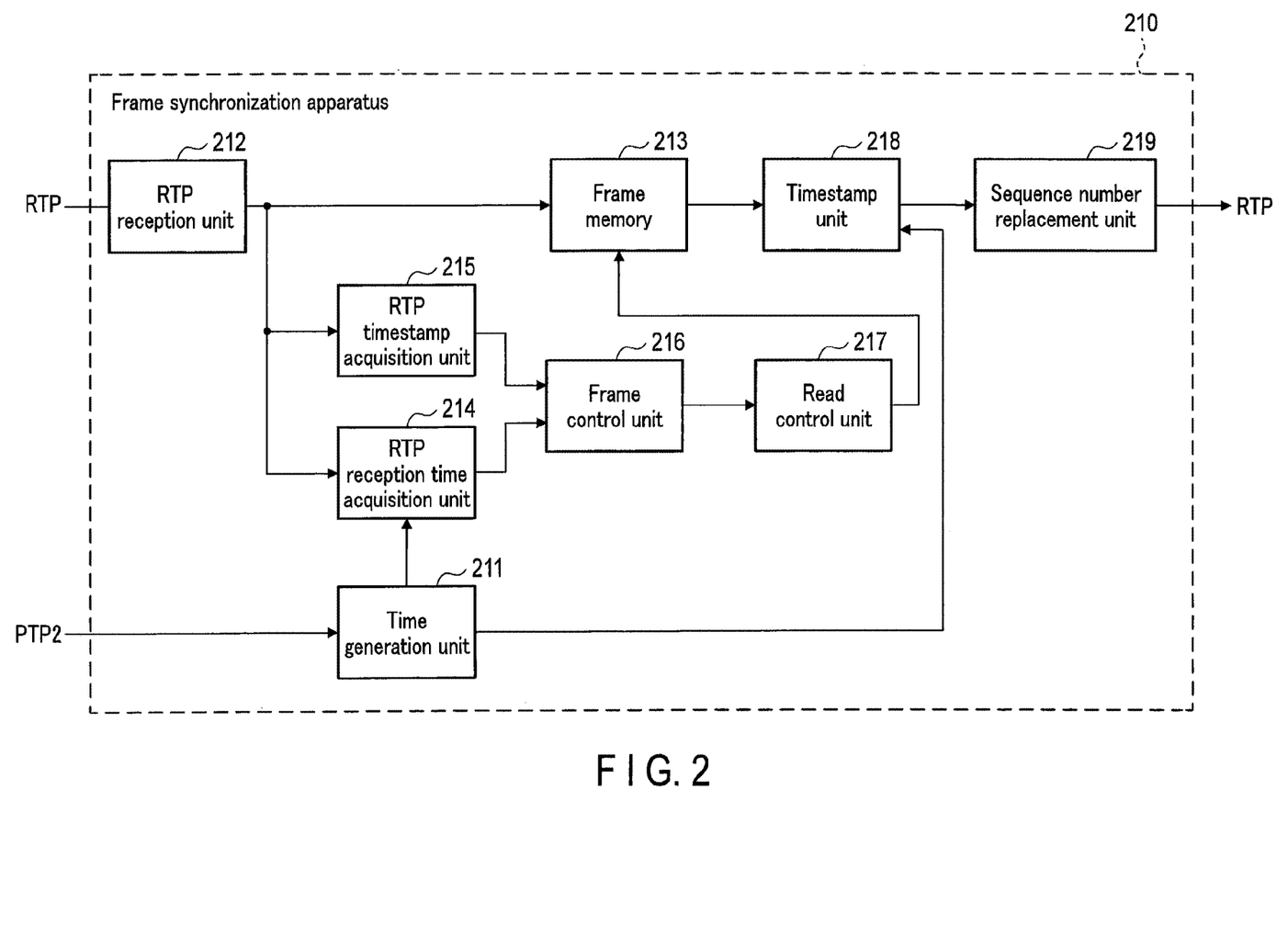
FIG. 2 is a diagram showing a configuration of a first embodiment of a frame synchronization apparatus shown in FIG. 1.
Figure 3:
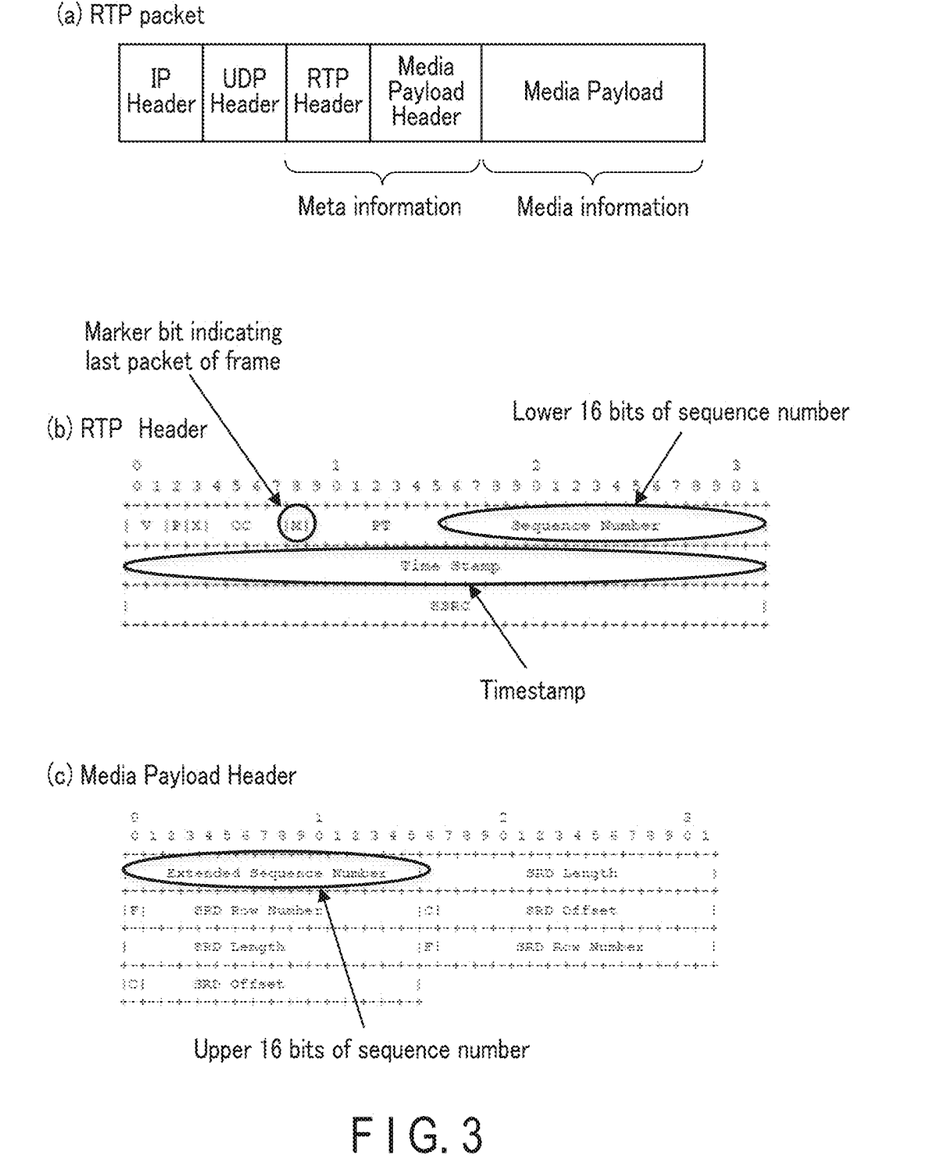
FIG. 3 is a diagram for explaining an example of a structure of an RTP packet.
Figure 4:
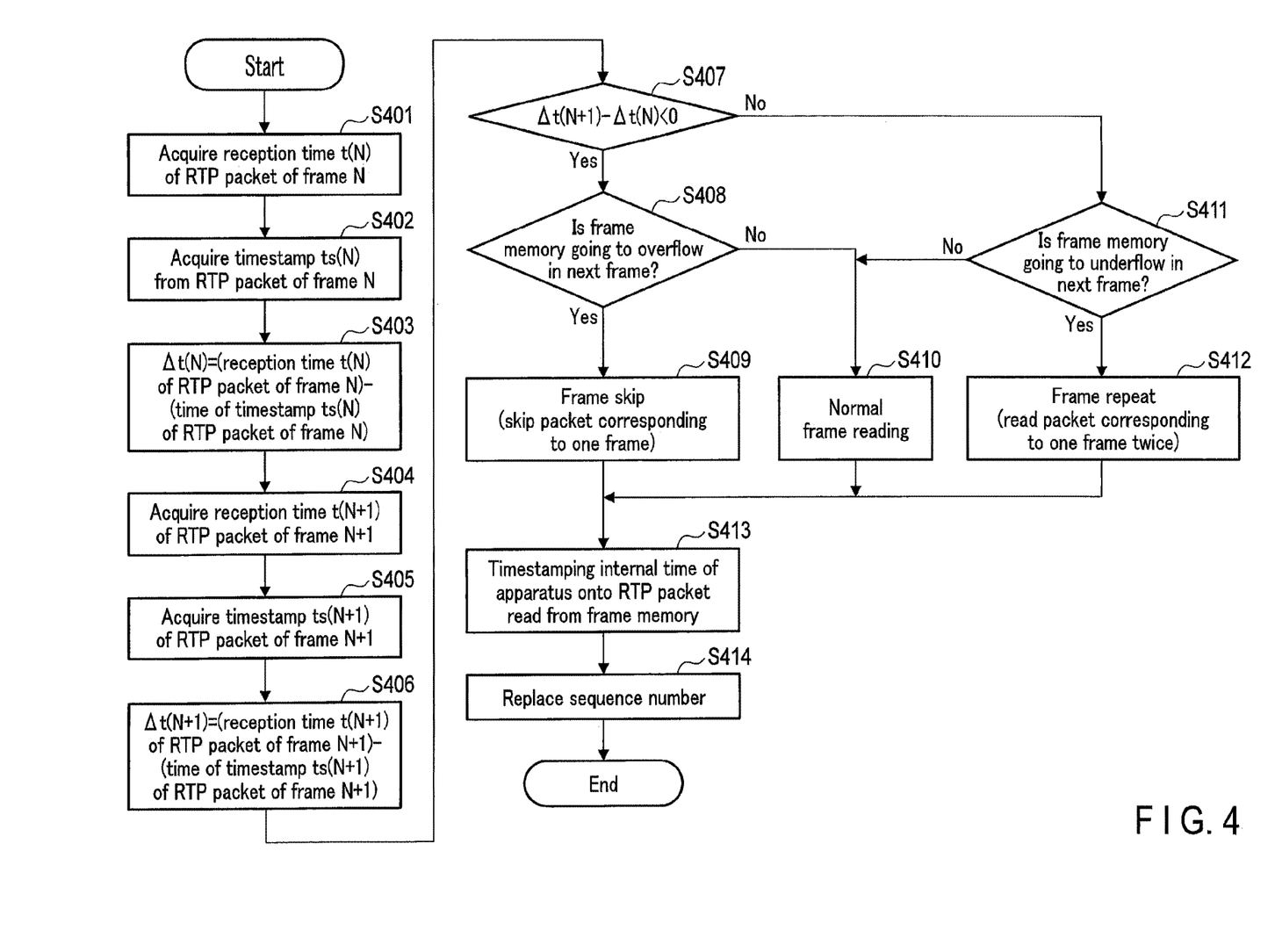
FIG. 4 is a flowchart for explaining processing of the frame synchronization apparatus shown in FIG. 2.

Specifically, as a first embodiment, the frame synchronization apparatus 210 to be described later with reference to FIGS. 2 to 4 is considered. The frame synchronization apparatus 210 obtains a time difference between the time indicated by a timestamp of video data included in the RTP packet and a reception time of the RTP packet based on the broadcasting station internal time PTP2, detects/monitors a variation in the time difference (hereinafter, referred to as a time difference variation), duplicates and skips a frame in accordance with the time difference variation, and updates the timestamp and the sequence number of the RTP packet based on the internal time (frame synchronization apparatus internal time described later), thereby performing frame synchronization of the video data.

Figure 5:
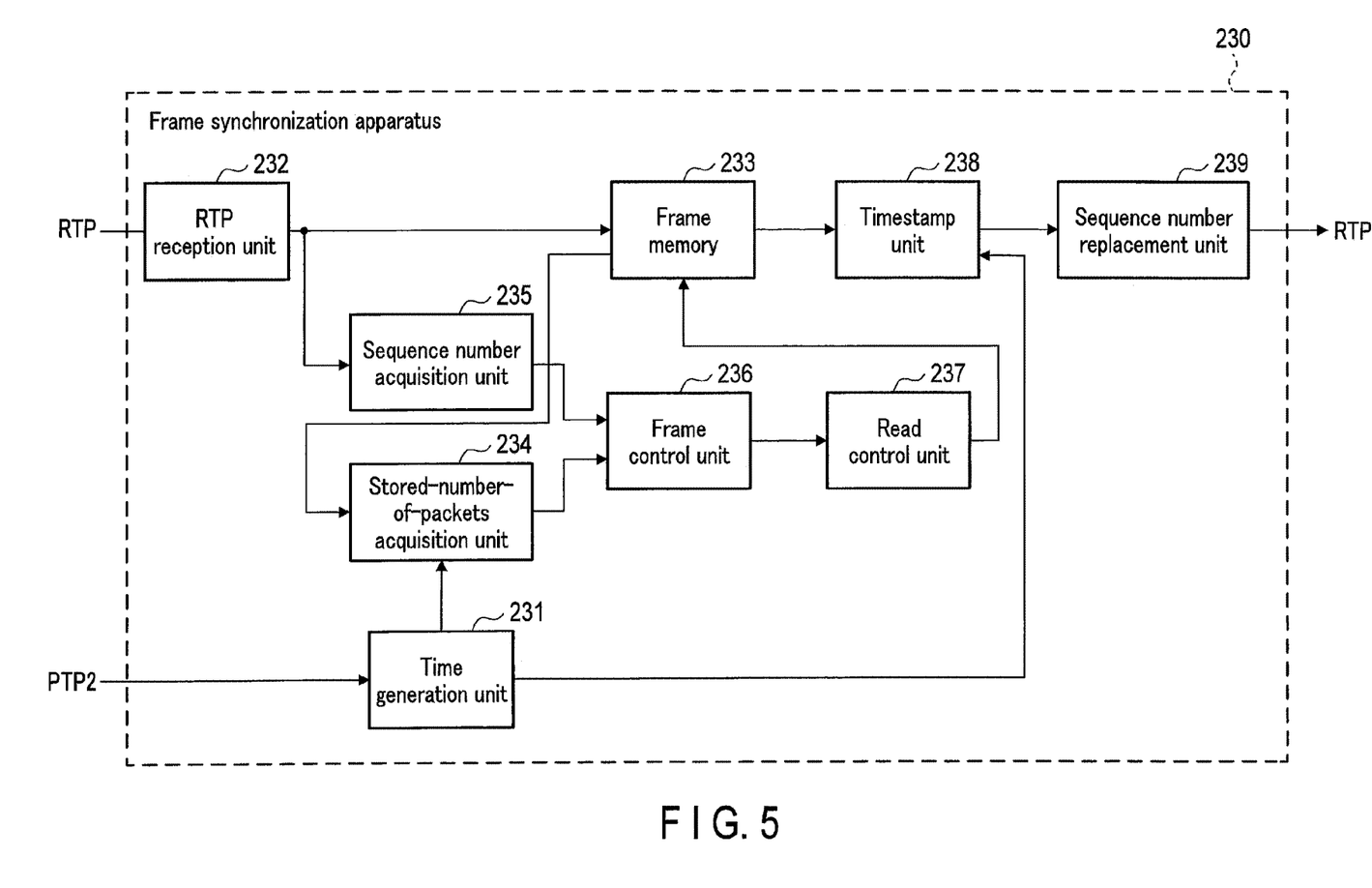
FIG. 5 is a diagram showing a configuration of a second embodiment of the frame synchronization apparatus shown in FIG. 1.
Figure 6:
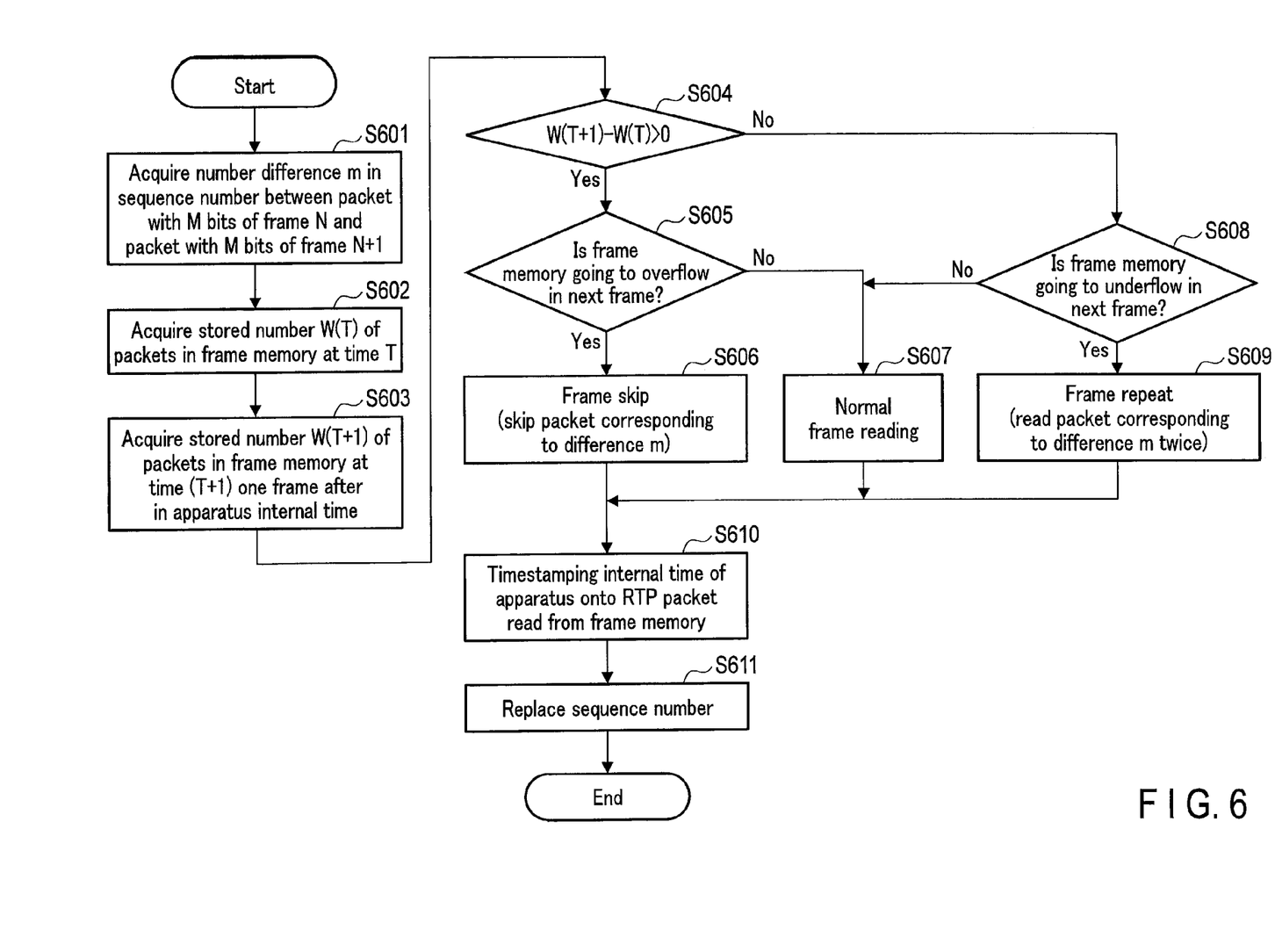
FIG. 6 is a flowchart for explaining processing of the frame synchronization apparatus shown in FIG. 5.

Further, as a second embodiment, a frame synchronization apparatus 230 which will be described later with reference to FIGS. 5 and 6 is considered. The frame synchronization apparatus 230, which is provided in the broadcasting station 200 in place of the frame synchronization apparatus 210, detects/monitors a variation in the number of packets stored in the frame memory in the frame synchronization apparatus 230 (hereinafter referred to as a variation in the stored number of packets), duplicates and skips a frame in accordance with the variation in the stored number of packets, and updates the timestamp and sequence number of the RTP packet based on the internal time, thereby performing frame synchronization of video data.

The IP reception apparatus 220 receives the RTP packet output from the frame synchronization apparatus 210 based on the broadcasting station internal time PTP2.

Next, a detailed configuration example of the frame synchronization apparatus 210 according to the first embodiment will be described with reference to FIG. 2. Note that, in the following description, the configuration of the frame synchronization apparatus 210 is depicted with a functional block diagram, but it goes without saying that these can be realized by a program stored in various storage media, and a processor or a working memory for executing the program.

As shown in FIG. 2, the frame synchronization apparatus 210 includes a time generation unit 211, an RTP reception unit 212, a frame memory 213, an RTP reception time acquisition unit 214, an RTP timestamp acquisition unit 215, a frame control unit 216, a read control unit 217, a timestamp unit 218, and a sequence number replacement unit 219.

The time generation unit 211 receives the broadcasting station internal time PTP2 from the PTP master 201 and generates a frame synchronization apparatus internal time synchronized with the received broadcasting station internal time PTP2.

The RTP reception unit 212 receives an RTP packet transmitted from the transmission source 100 through the network NW, and outputs the RTP packet to the frame memory 213, the RTP reception time acquisition unit 214, and the RTP timestamp acquisition unit 215.

The RTP packet has a structure as shown in FIG. 3, for example. Specifically, as shown in FIG. 3 (a), one RTP packet includes an IP header, a UDP header, meta information, and media information. The meta information includes an RTP header and a media payload header.

The RTP header has a structure as shown in FIG. 3 (b). One frame of video data is divided into several consecutive RTP packets and stored, and a marker bit M is stored in the RTP header of the RTP packet storing the last frame of the divided frames. Therefore, the break (boundary or border) between frames can be discriminated from the marker bit M.

The RTP header also includes the lower 16 bits of the sequence number, a timestamp, and the like. The upper 16 bits of the sequence number are included in the media payload header having a structure as shown in FIG. 3 (c).

Here, the timestamp indicates a time that is stamped based on the transmission source internal time PTP1 of the transmission source 100. The sequence number is a counter value that is incremented and assigned to each RTP packet.

The frame memory 213 stores (buffers) the RTP packet received by the RTP reception unit 212 without depacketizing the RTP packet, and outputs the stored RTP packet under the control of the read control unit 217.

The frame memory 213 can store RTP packets of a plurality of frames. For example, data is stored and read by cyclically using the entire storage area, and reading and writing are controlled by using a read pointer indicating a read position and a write pointer indicating a write position.

The RTP reception time acquisition unit 214 monitors the RTP header of the RTP packet output from the RTP reception unit 212 to the frame memory 213, and in a case where the marker bit M indicating the last packet of the frame is included in the RTP packet, acquires the reception time of the RTP packet based on the frame synchronization apparatus internal time. This reception time is output to the frame control unit 216.

The RTP timestamp acquisition unit 215 monitors the RTP header of the RTP packet output from the RTP reception unit 212 to the frame memory 213, and in a case where the marker bit M indicating the last packet of the frame is included in the RTP packet, acquires the timestamp from the RTP header of the RTP packet. This timestamp is output to the frame control unit 216.

The frame control unit 216 obtains a time difference between the reception time output from the RTP reception time acquisition unit 214 and the time indicated by the timestamp output from the RTP timestamp acquisition unit 215. Then, the frame control unit 216 detects a time difference variation that may occur between this time difference and the previously obtained time difference. This time difference variation is output to the read control unit 217.

The read control unit 217 reads the RTP packet stored in the frame memory 213 in accordance with the time difference variation. The read RTP packet is output to the timestamp unit 218.

The timestamp unit 218 performs stamping to replace the timestamp included in the RTP header of the read RTP packet with a timestamp based on the frame synchronization apparatus internal time generated by the time generation unit 211. The RTP packet in which the timestamp has been replaced is output to the sequence number replacement unit 219.

The sequence number replacement unit 219 includes a counter therein, and renumbers the sequence numbers included in the RTP header and the media payload header of the RTP packet to values incremented by the counter.

Thus, the RTP packets read out from the frame memory 213 are given consecutive sequence numbers. In this way, the RTP packet in which the timestamp and the sequence number are updated is output to the IP reception apparatus 220.

Next, operations of the frame synchronization apparatus 210 according to the first embodiment will be described with reference to FIG. 4. It is assumed that the RTP reception unit 212 sequentially receives RTP packets and stores the received RTP packets in the frame memory 213 in parallel with the processing described below.

In step 401, the RTP reception time acquisition unit 214 acquires a reception time t(N) of the RTP packet of a certain frame N. Here, N is any natural number defined to explain frame continuity in the following description, and a frame next to the frame N is referred to as a frame N+1.

Specifically, the RTP reception time acquisition unit 214 monitors the RTP header of the RTP packet received by the RTP reception unit 212. Then, upon detection of the RTP packet including the marker bit M indicating the last packet of the N frame, the RTP reception time acquisition unit 214 acquires the reception time t(N) of the detected RTP packet based on the frame synchronization apparatus internal time, outputs the reception time t(N) to the frame control unit 216, and proceeds to step 402.

In step 402, the RTP timestamp acquisition unit 215 acquires a timestamp ts(N) from the RTP packet of the frame N in the same manner as the RTP reception time acquisition unit 214 in step 401.

Specifically, the RTP timestamp acquisition unit 215 monitors the RTP header of the RTP packet received by the RTP reception unit 212. Then, upon detection of the RTP packet including the marker bit M indicating the last packet of the N frame, the RTP timestamp acquisition unit 215 acquires the timestamp ts(N) from the RTP header of the detected RTP packet, outputs the timestamp ts(N) to the frame control unit 216, and proceeds to step 403.

In step 403, the frame control unit 216 obtains a time difference $\Delta t(N)$ between the reception time t(N) of the frame N acquired by the RTP reception time acquisition unit 214 in step 401 and the time indicated by the timestamp ts(N) of the frame N acquired by the RTP timestamp acquisition unit 215 in step 402, and proceeds to step 404.

In step 404, the RTP reception time acquisition unit 214 acquires a reception time t(N+1) of the RTP packet of the frame N+1. As described above, the frame N+1 is a frame of a video subsequent to the frame N.

Specifically, the RTP reception time acquisition unit 214 monitors the RTP header of the RTP packet received by the RTP reception unit 212. Then, upon detection of the RTP packet including the marker bit M indicating the last packet of the N+1 frame, the RTP reception time acquisition unit 214 acquires the reception time t(N+1) of the detected RTP packet based on the frame synchronization apparatus internal time, outputs the reception time t(N+1) to the frame control unit 216, and proceeds to step 405.

In step 405, the RTP timestamp acquisition unit 215 acquires a timestamp ts(N+1) from the RTP packet of the frame N+1 in the same manner as the RTP reception time acquisition unit 214 in step 404.

Specifically, the RTP timestamp acquisition unit 215 monitors the RTP header of the RTP packet received by the RTP reception unit 212. Then, upon detection of the RTP packet including the marker bit M indicating the last packet of the N+1 frame, the RTP timestamp acquisition unit 215 acquires the timestamp ts(N+1) from the RTP header of the detected RTP packet, outputs the timestamp ts(N+1) to the frame control unit 216, and proceeds to step 406.

In step 406, the frame control unit 216 obtains a time difference $\Delta t(N+1)$ between the reception time t(N+1) of the frame N+1 acquired by the RTP reception time acquisition unit 214 in step 404 and the time indicated by the timestamp ts(N+1) of the frame N+1 acquired by the RTP timestamp acquisition unit 215 in step 405, and proceeds to step 407.

In step 407, the frame control unit 216 obtains a time difference variation that may occur between the time difference $\Delta t(N+1)$ and the time difference $\Delta t(N)$, and proceeds to a process according to the time difference variation.

Specifically, the frame control unit 216 obtains a difference between the time difference $\Delta t(N+1)$ and the time difference $\Delta t(N)$ as a time difference variation, and outputs the time difference variation to the read control unit 217.

If the time difference variation is negative, the process proceeds to step 408, whereas if the time difference variation is not negative, the process proceeds to step 411.

In the case where the time difference variation is negative, the PTP1 of the transmission source 100 is relatively earlier than the PTP2 of the broadcasting station 200. On the other hand, in the case where the time difference variation is not negative, the PTP1 of the transmission source 100 is relatively later than or equal to the PTP2 of the broadcasting station 200.

In step 408, the read control unit 217 detects the number of RTP packets stored in the frame memory 213, and determines whether or not the frame memory 213 is going to overflow (the buffered RTP packets are going to exceed a predetermined storage capacity) in a case of storing several consecutive RTP packets constituting the next frame. Here, if it is determined that an overflow is going to occur, the process proceeds to step 409, whereas if it is determined that no overflow is going to occur, the process proceeds to step 410.

In step 409, the read control unit 217 performs frame skip to read the RTP packet stored in the frame memory 213. Then, the read control unit 217 outputs the read RTP packet to the timestamp unit 218, and proceeds to step 413.

More specifically, the read control unit 217 skips the RTP packet of the oldest frame among the RTP packets stored in the frame memory 213 (changes the position of the read pointer by one frame), reads the RTP packet of the next frame, and outputs the read RTP packet to the timestamp unit 218.

The RTP packet of the skipped frame and the read RTP packet are erased from the frame memory 213. Here, "erase" is an expression for simplifying the description, and does not necessarily indicate that a process of actually erasing data is executed.

For example, the erasure mentioned above may be performed by changing the position of the write pointer indicating a data write start address in the storage area of the frame memory 213 so that the area in which the read RTP packet is stored is overwritten. In the following description, for the sake of simplicity, substantial data erasure by changing the position of the write pointer will be simply referred to as erasure.

In step 410, the read control unit 217 reads the oldest RTP packet stored in the frame memory 213 at a normal timing. Then, the read control unit 217 outputs the read RTP packet to the timestamp unit 218, and proceeds to step 413. The read RTP packet is erased from the frame memory 213 in the same manner.

In step 411, the read control unit 217 detects the number of RTP packets stored in the frame memory 213, and determines whether or not the frame memory 213 is going to underflow (buffered RTP packets fall below a predetermined amount) in a case of reading several consecutive RTP packets constituting the next frame. Here, if it is determined that an underflow is going to occur, the process proceeds to step 412, whereas if it is determined that no underflow is going to occur, the process proceeds to step 410.

In step 412, the read control unit 217 performs frame repeat, and reads twice the RTP packet of the same frame stored in the frame memory 213. Then, the read control unit 217 outputs the read RTP packet to the timestamp unit 218, and proceeds to step 413.

More specifically, the read control unit 217 reads all the RTP packets that constitute the oldest frame among the RTP packets stored in the frame memory 213 and outputs them to the timestamp unit 218. Thereafter, to read the same frame again, the read control unit 217 moves back the position of the read pointer, for example, by one frame, reads the RTP packets of the same frame again, and outputs them to the timestamp unit 218. Then, the read control unit 217 erases from the frame memory 213 the RTP packets of the frame that was read twice.

In step 413, the timestamp unit 218 performs stamping to replace the timestamp included in the RTP header of the RTP packet read by the read control unit 217 with a timestamp based on the frame synchronization apparatus internal time generated by the time generation unit 211, and the process proceeds to step 414. The RTP packet in which the timestamp has been replaced is output to the sequence number replacement unit 219.

In step 414, the sequence number replacement unit 219 renumbers the sequence number included in the RTP header and the media payload header of the RTP packet output from the timestamp unit 218 to a value counted by the counter provided inside.

Thus, the RTP packets read out from the frame memory 213 are given consecutive sequence numbers unique to the frame synchronization apparatus 210. In this way, the RTP packet in which the sequence number is updated is output to the IP reception apparatus 220.

As described above, in the content distribution system having the above-described configuration, the frame synchronization apparatus 210 provided in the broadcasting station 200 obtains the difference between the time indicated by the timestamp included in the RTP packet and the reception time of the RTP packet, and adjusts the number of frames by skipping or repeating frames in accordance with the variation in the difference (the above-described time difference variation). In the adjusted RTP packet, a timestamp is stamped based on the broadcasting station internal time PTP2, and the sequence number is renumbered.

Therefore, according to the content distribution system having the above-described configuration, even if the RTP packet is asynchronous with the broadcasting station internal time PTP2 of the broadcasting station 200, the RTP packet synchronized with the broadcasting station internal time PTP2 can be generated at a low calculation cost without depacketizing/packetizing the RTP packet.

Next, a detailed configuration example of the frame synchronization apparatus 230 according to the second embodiment will be described with reference to FIG. 5. Note that, in the following description, the configuration of the frame synchronization apparatus 230 is depicted with a functional block diagram, but it goes without saying that these can be realized by a program stored in various storage media, and a processor or a working memory for executing the program.

Since the configuration of the entire system is the same as that shown in FIG. 1, a description thereof will be omitted. The structure of an RTP packet handled in the second embodiment is the same as that described in the first embodiment with reference to FIG. 3, and a detailed description thereof will be omitted.

As shown in FIG. 5, the frame synchronization apparatus 230 includes a time generation unit 231, an RTP reception unit 232, a frame memory 233, a stored-number-of-packets acquisition unit 234, a sequence number acquisition unit 235, a frame control unit 236, a read control unit 237, a timestamp unit 238, and a sequence number replacement unit 239.

The time generation unit 231 receives the broadcasting station internal time PTP2 from the PTP master 201 and generates a frame synchronization apparatus internal time synchronized with the received broadcasting station internal time PTP2.

The RTP reception unit 232 receives an RTP packet transmitted from the transmission source 100 through the network NW, and outputs the RTP packet to the frame memory 233 and the sequence number acquisition unit 235.

The frame memory 233 stores (buffers) the RTP packet received by the RTP reception unit 232 without depacketizing the RTP packet, and outputs the stored RTP packet under the control of the read control unit 237. In addition, the frame memory 233 can store RTP packets of a plurality of frames, and for example, the entire storage area is used cyclically to store and read data.

The stored-number-of-packets acquisition unit 234 acquires the number of RTP packets stored in the frame memory 233 for each time corresponding to one frame based on the frame synchronization apparatus internal time generated by the time generation unit 231, and outputs the number (hereinafter, referred to as the stored number of packets) to the frame control unit 236.

As a specific method of acquiring the number of packets, the number of packets is obtained from the difference between the position of a write pointer and the position of a read pointer of the frame memory 233. In a case of performing frame skip or repeat, which will be described later, a value obtained by compensating for the frame skip or repeat is obtained.

The sequence number acquisition unit 235 monitors the RTP header of the RTP packet output from the RTP reception unit 232 to the frame memory 233, and in a case where the marker bit M indicating the last packet of the frame is included in the RTP packet, acquires the sequence number from the meta information of the RTP packet. The acquired sequence number is output to the frame control unit 236.

The frame control unit 236 obtains a variation in the sequence numbers sequentially acquired by the sequence number acquisition unit 235 (the difference between the sequence numbers in one frame; hereinafter referred to as the number variation), and compares this number variation with the variation in the stored number of packets acquired by the stored-number-of-packets acquisition unit 234 (hereinafter referred to as a variation in the stored number of packets). Then, the frame control unit 236 instructs the read control unit 237 to execute a process corresponding to the comparison result.

The read control unit 237 reads the RTP packet stored in the frame memory 233 in accordance with an instruction from the frame control unit 236. The read RTP packet is output to the timestamp unit 238.

The timestamp unit 238 performs stamping to replace the timestamp included in the RTP header of the read RTP packet with a timestamp based on the frame synchronization apparatus internal time generated by the time generation unit 231. The RTP packet in which the timestamp has been replaced is output to the sequence number replacement unit 239.

The sequence number replacement unit 239 includes a counter therein, and renumbers the sequence numbers included in the RTP header and the media payload header of the RTP packet to values incremented by the counter.

Thus, the RTP packets read out from the frame memory 233 are given consecutive sequence numbers. In this way, the RTP packet in which the timestamp and the sequence number are updated is output to the IP reception apparatus 220.

Next, operations of the frame synchronization apparatus 230 according to the second embodiment will be described with reference to FIG. 6. It is assumed that the RTP reception unit 232 sequentially receives RTP packets and stores the received RTP packets in the frame memory 233 in parallel with the processing described below.

In step 601, the frame control unit 236 compares the sequence numbers sequentially acquired by the sequence number acquisition unit 235 to obtain a number variation, and proceeds to step 602. Specifically, the difference between the sequence number of the RTP packet including the marker bit M of a certain frame N and the sequence number of the RTP packet including the marker bit M of the next frame N+1 is obtained as a number variation m. Here, N is any natural number defined to explain frame continuity in the following description, and a frame next to the frame N is referred to as a frame N+1.

In step 602, the stored-number-of-packets acquisition unit 234 acquires the stored number W(T) of RTP packets stored in the frame memory 233 at a certain time T, outputs the stored number W(T) and the acquisition time to the frame control unit 236, and proceeds to step 603.

In step 603, the stored-number-of-packets acquisition unit 234 acquires the stored number W(T+1) of RTP packets stored in the frame memory 233 at the timing (T+1) when the time for one frame has elapsed from the time T, outputs the stored number W(T+1) and the acquisition time to the frame control unit 236, and proceeds to step 604.

In step 604, the frame control unit 236 compares and determines whether or not the difference between the stored number W(T+1) and the stored number W(T) is larger than the number variation m obtained in step 601. Here, if the difference between the stored number W(T+1) and the stored number W(T) is larger than the number variation m, the process proceeds to step 605, whereas if the difference is not larger than the number variation m, the process proceeds to step 608.

In the case where the difference is larger than the number variation m, the PTP1 of the transmission source 100 is relatively earlier than the PTP2 of the broadcasting station 200. On the other hand, in the case where the difference is not larger than the number variation m, the PTP1 of the transmission source 100 is relatively later than or equal to the PTP2 of the broadcasting station 200.

In step 605, the read control unit 237 detects the number of RTP packets stored in the frame memory 233, and determines whether or not the frame memory 233 is going to overflow (the buffered RTP packets are going to exceed a predetermined storage capacity) in a case of storing several consecutive RTP packets constituting the next frame. Here, if it is determined that an overflow is going to occur, the process proceeds to step 606, whereas if it is determined that no overflow is going to occur, the process proceeds to step 607.

In step 606, the read control unit 237 performs frame skip to read the RTP packet stored in the frame memory 233. Then, the read control unit 237 outputs the read RTP packet to the timestamp unit 238, and proceeds to step 610.

More specifically, the read control unit 237 skips the packets corresponding to the difference m obtained in step 601 among the RTP packets constituting the oldest frame among the RTP packets stored in the frame memory 233, reads the RTP packets from the next RTP packet, and outputs the read RTP packets to the timestamp unit 238.

Note that the skipped RTP packet and the read RTP packet are erased from the frame memory 233 (the position of the write pointer is changed to a write target area).

On the other hand, in step 607, the read control unit 237 reads the oldest RTP packet stored in the frame memory 233 at a normal timing. Then, the read control unit 237 outputs the read RTP packet to the timestamp unit 238, and proceeds to step 610. The read RTP packet is erased from the frame memory 233 in the same manner.

In step 608, the read control unit 237 detects the number of RTP packets stored in the frame memory 233, and determines whether or not the frame memory 233 is going to underflow (buffered RTP packets fall below a predetermined amount) in a case of reading several consecutive RTP packets constituting the next frame. Here, if it is determined that an underflow is going to occur, the process proceeds to step 609, whereas if it is determined that no underflow is going to occur, the process proceeds to step 607.

In step 609, the read control unit 237 performs frame repeat to read twice the RTP packet of the same frame stored in the frame memory 233. Then, the read control unit 237 outputs the read RTP packet to the timestamp unit 238, and proceeds to step 610.

More specifically, the read control unit 237 reads RTP packets that constitute the oldest frame among the RTP packets stored in the frame memory 233 and outputs them to the timestamp unit 238. Thereafter, the read control unit 237 moves back the position of the read pointer, for example, by the difference m obtained in step 601, reads the RTP packets by the difference m again, and outputs them to the timestamp unit 238. Then, the read control unit 237 erases from the frame memory 233 the RTP packets of the frame that was read twice.

In step 610, the timestamp unit 238 performs stamping to replace the timestamp included in the RTP header of the RTP packet read by the read control unit 237 with a timestamp based on the frame synchronization apparatus internal time generated by the time generation unit 231, and the process proceeds to step 611. The RTP packet in which the timestamp has been replaced is output to the sequence number replacement unit 239.

In step 611, the sequence number replacement unit 239 renumbers the sequence number included in the RTP header and the media payload header of the RTP packet output from the timestamp unit 238 to a value counted by the counter provided inside.

Thus, the RTP packets read out from the frame memory 233 are given consecutive sequence numbers unique to the frame synchronization apparatus 230. In this way, the RTP packet in which the sequence number is updated is output to the IP reception apparatus 220.

As described above, in the content distribution system having the above-described configuration, the frame synchronization apparatus 230 provided in the broadcasting station 200 obtains the difference in sequence number between frames (the number variation), obtains the variation in the stored number of packets in the frame memory 233 within the time corresponding to one frame based on the broadcasting station internal time PTP2, and adjusts the number of frames by skipping or repeating frames in accordance with the magnitude relationship between the number variation and the variation in the stored number of packets. In the adjusted RTP packet, a timestamp is stamped based on the broadcasting station internal time PTP2, and the sequence number is renumbered.

Thus, according to the content distribution system having the above-described configuration, even if the RTP packet is asynchronous with the broadcasting station internal time PTP2 of the broadcasting station 200, the RTP packet synchronized with the broadcasting station internal time PTP2 can be generated at a low calculation cost without depacketizing/packetizing the RTP packet. Therefore, the frame synchronization processing can be performed quickly.

The present invention is not limited to the embodiment described above and can be embodied in practice by modifying the structural elements without departing from the gist of the invention. In addition, various inventions can be made by suitably combining the structural elements disclosed in connection with the above embodiments. Furthermore, for example, a configuration may be considered in which some structural elements of all the structural elements described in the embodiment are deleted. Furthermore, structural elements of different embodiments may be suitably combined.

For example, in the embodiment described above, the transmission source 100 uses a time source other than the GNSS, and the broadcasting station 200 uses the GNSS as the time source. However, the types of time sources may be reversed. That is, the embodiment can be applied to a case where the transmission source 100 uses the GNSS as a time source and the broadcasting station 200 uses a time source other than the GNSS.

Alternatively, the embodiment can be applied to a case where the GNSS is used as the time source of both of the transmission source 100 and the broadcasting station 200. For example, even in the case where the GNSS is used as the time source in both, frame synchronization can be performed by the frame synchronization apparatus 210 or 230 even if an inaccurate timestamp is stamped in the RTP packet due to some trouble on the transmission source 100 side.

Further, in the above-described embodiment, the case where Δt(N) and W(T) are obtained for the consecutive frames N and N+1 has been described as an example, but the embodiment is not limited to the consecutive frames. For example, frames separated by a preset number L may be compared, or an average value of values obtained for L consecutive or nonconsecutive frames may be used.

Furthermore, L may be dynamically changed in accordance with the magnitude of the frequency deviation (for example, Δt(N+L)−Δt(N) or W(T+L)−W(T)), the traffic of the network NW, the communication time zone, or the like.

In the second embodiment, the read control unit 237 skips the packets or reads the packets twice by the amount of variation m of the sequence number in accordance with the stored number of packets changed during the time corresponding to one frame so that the frame memory 233 does not overflow or underflow. However, the embodiment is not limited to this.

First Modification of Second Embodiment

As a first modification instead of this, the frame control unit 236 obtains a difference between the sequence number of the RTP packet including the marker bit M of the frame N and the sequence number of the RTP packet including the marker bit M of the next frame N+1 as the number variation m, and obtains a variation m' of the sequence number acquired from the packet data received at the timing based on the time generated by the time generation unit 231, and the read control unit 237 skips the packet or reads the packet twice in accordance with the variations m and m' so that the frame memory 233 does not overflow or underflow.

Specifically, the frame control unit 236 obtains the difference m in the same manner as in step 601, and obtains a variation (difference m') of the sequence number for each time corresponding to one frame on the basis of the sequence number of the RTP packet received at the timing for each time corresponding to one frame on the basis of the apparatus internal time generated by the time generation unit 231, as a process instead of steps 602 to 603.

Then, as a process corresponding to step 604, the frame control unit 236 determines the magnitude relationship between the differences m and m'. As a process corresponding to steps 605 to 609, the read control unit 237 performs frame skip or frame repeat in order to prevent the frame memory from overflowing or underflowing depending on whether the frame memory is going to overflow or underflow.

Even in the first modification, the RTP packet synchronized with the broadcasting station internal time PTP2 can be generated at a low calculation cost, and the frame synchronization processing can be quickly performed.

Second Modification of Second Embodiment

As a second modification, the read control unit 237 skips packets or reads packets twice by the amount of sequence number variation m so that the frame memory 233 does not overflow or underflow in accordance with a change in the number of packets received during the time corresponding to one frame.

Specifically, a received-number-of-packets acquisition unit 234' is provided as a control function in place of the stored-number-of-packets acquisition unit 234. The received-number-of-packets acquisition unit 234' monitors the output of the RTP reception unit 232 and counts the number of received RTP packets.

Then, the received-number-of-packets acquisition unit 234' acquires the received number N(T) by counting the number of received RTP packets (the cumulative value of the number of received packets) up to a certain time T in step 602, and acquires the received number N(T+1) by counting the number of received RTP packets (the cumulative value) up to a time T+1 one frame after the time T in step 603.

Then, as a process corresponding to step 604, the frame control unit 236 compares and determines whether or not the difference between the received number N(T+1) and the received number N(T) is larger than the number variation m obtained in step 601.

Thereafter, similarly to the second embodiment, in steps 605 to 609, the read control unit 237 performs frame skip or frame repeat of the packets corresponding to the difference m in order to prevent the frame memory from overflowing or underflowing depending on whether the frame memory is going to overflow or underflow.

Even in the second modification, the RTP packet synchronized with the broadcasting station internal time PTP2 can be generated at a low calculation cost, and the frame synchronization processing can be quickly performed.

It is needless to say that various modifications can be made without departing from the scope of the present invention.

While several embodiments have been described, these embodiments have been presented by way of example and are not intended to limit the scope of the invention. Indeed, the novel embodiments described herein may be embodied in a variety of other forms; furthermore, various omissions, substitutions and changes in the form of the embodiments described herein may be made without departing from the spirit of the inventions. The embodiments and their modifications are included in the scope and spirit of the invention and are included in the scope of the claimed inventions and their equivalents.

What is claimed is:

1. A frame synchronization apparatus comprising:
   a reception unit configured to receive packet data including video data and a timestamp;
   a frame memory configured to store the packet data received by the reception unit;
   a time generation unit configured to generate a time based on a reference synchronization signal;
   a reception time acquisition unit configured to acquire a reception time of packet data satisfying a predetermined condition based on the time generated by the time generation unit;
   a timestamp acquisition unit configured to acquire the timestamp from the packet data satisfying the predetermined condition; and
   a control unit configured to obtain a difference between the reception time and a time indicated by the timestamp, and read packet data from the frame memory in accordance with a variation in the difference, wherein
   the video data of one frame is divided into a plurality of consecutive packet data and stored,
   the packet data includes a marker bit indicating a boundary between frames in a case where subsequent packet data includes video data of another frame,
   the reception time acquisition unit acquires the reception time of the packet data including the marker bit based on the time generated by the time generation unit, and
   the timestamp acquisition unit acquires the timestamp from the packet data including the marker bit.

2. The frame synchronization apparatus according to claim 1, wherein
   the control unit obtains a difference between the reception time and the time indicated by the timestamp for each of two consecutive frames, and reads packet data from the frame memory in accordance with a variation in difference between the two.

3. The frame synchronization apparatus according to claim 1, wherein
   the control unit obtains a difference between the reception time and the time indicated by the timestamp for each of two nonconsecutive frames, and reads packet data from the frame memory in accordance with a variation in difference between the two.

4. The frame synchronization apparatus according to claim 1, wherein
   the control unit reads packet data from the frame memory by frame skip or frame repeat in accordance with the variation.

5. A frame synchronization apparatus comprising:
   a reception unit configured to receive packet data including video data and a sequence number;
   a frame memory configured to store the packet data received by the reception unit;
   a time generation unit configured to generate a time based on a reference synchronization signal;
   a stored number acquisition unit configured to acquire the number of pieces of packet data stored in the frame memory at a predetermined timing based on the time generated by the time generation unit;
   a sequence number acquisition unit configured to acquire a sequence number from packet data satisfying a predetermined condition; and
   a control unit configured to read packet data from the frame memory in accordance with a variation in the number of pieces of packet data acquired by the stored number acquisition unit and a variation in the sequence number acquired by the sequence number acquisition unit.

6. The frame synchronization apparatus according to claim 5, wherein
   the video data of one frame is divided into a plurality of consecutive packet data and stored,
   the packet data includes a marker bit indicating a boundary between frames in a case where subsequent packet data includes video data of another frame,
   the stored number acquisition unit acquires the number of pieces of packet data stored in the frame memory at a timing of a time corresponding to the frame based on the time generated by the time generation unit, and
   the sequence number acquisition unit acquires a sequence number from the packet data including the marker bit.

7. The frame synchronization apparatus according to claim 6, wherein
   the control unit obtains a variation in the number of pieces of packet data acquired by the stored number acquisition unit and a variation in the sequence number acquired by the sequence number acquisition unit for each of two consecutive frames, and reads packet data from the frame memory in accordance with the variation in the number of pieces of packet data and the variation in the sequence number.

8. The frame synchronization apparatus according to claim 6, wherein
   the control unit obtains a variation in the number of pieces of packet data acquired by the stored number acquisition unit and a variation in the sequence number acquired by the sequence number acquisition unit for each of two nonconsecutive frames, and reads packet data from the frame memory in accordance with the variation in the number of pieces of packet data and the variation in the sequence number.

9. A frame synchronization apparatus comprising:
   a reception unit configured to receive packet data including video data and a sequence number;
   a frame memory configured to store the packet data received by the reception unit;
   a time generation unit configured to generate a time based on a reference synchronization signal;
   a sequence number acquisition unit configured to acquire a sequence number from packet data; and
   a control unit configured to read packet data from the frame memory in accordance with a variation in a sequence number acquired from packet data satisfying a predetermined condition and a variation in a sequence number acquired from packet data received at a timing based on the time generated by the time generation unit.

10. A frame synchronization apparatus comprising:
    a reception unit configured to receive packet data including video data and a sequence number;

a frame memory configured to store the packet data received by the reception unit;

a time generation unit configured to generate a time based on a reference synchronization signal;

a received number acquisition unit configured to acquire a received number of pieces of packet data at a predetermined timing based on the time generated by the time generation unit;

a sequence number acquisition unit configured to acquire a sequence number from packet data satisfying a predetermined condition; and a control unit configured to read packet data from the frame memory in accordance with a variation in the received number of pieces of packet data acquired by the received number acquisition unit and a variation in the sequence number acquired by the sequence number acquisition unit.

11. The frame synchronization apparatus according to claim 5, wherein the control unit reads packet data from the frame memory by frame skip or frame repeat in accordance with the variation in the number of pieces of packet data and the variation in the sequence number.

12. The frame synchronization apparatus according to claim 1, further comprising a stamping unit configured to replace a timestamp included in the packet data read by the control unit with a timestamp based on the time.

13. The frame synchronization apparatus according to claim 5, further comprising a replacement unit configured to renumber the sequence number included in the packet data read by the control unit.

* * * * *